June 9, 1953 L. T. FINIZIE 2,641,177
COOKING APPARATUS
Filed Dec. 5, 1950 4 Sheets-Sheet 1

Inventor
Lyonel T. Finizie
By Rockwell & Bartholow
Attorneys

June 9, 1953 L. T. FINIZIE 2,641,177
COOKING APPARATUS
Filed Dec. 5, 1950 4 Sheets-Sheet 3

Inventor
Lyonel T. Finizie
By Rockwell & Bartholow
Attorneys

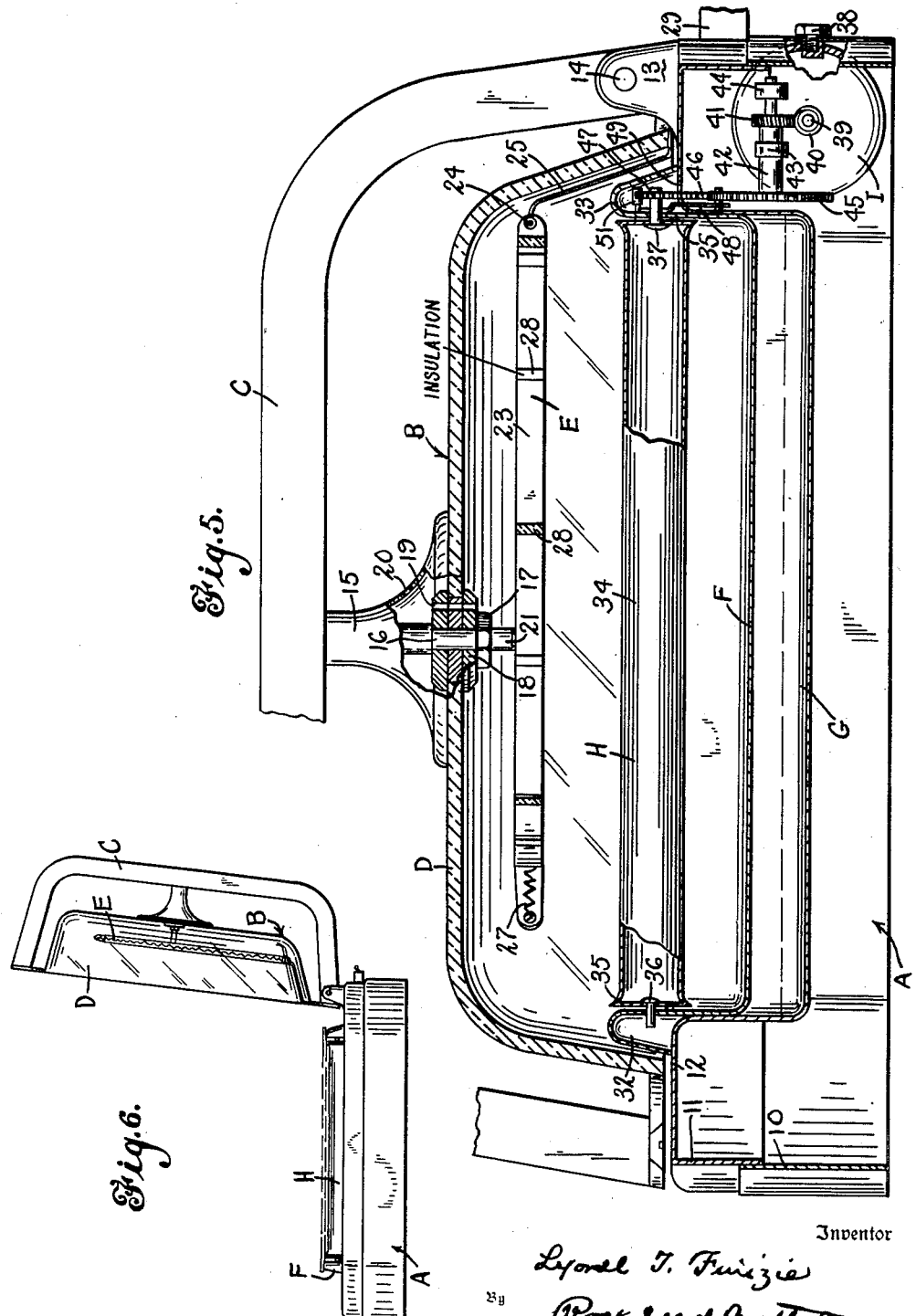

Patented June 9, 1953

2,641,177

UNITED STATES PATENT OFFICE 2,641,177

COOKING APPARATUS

Lyonel T. Finizie, Grand Prairie, Tex., assignor to Edmond J. Finizie, Bridgeport, Conn.

Application December 5, 1950, Serial No. 199,218

5 Claims. (Cl. 99—422)

This invention relates to cooking apparatus, and while not limited thereto it pertains especially to an appliance for broiling frankfurters.

An object of the invention is to provide an improved, conveniently operable apparatus in which the cooking is effected by radiant heat.

Another object is to provide an appliance in which the frankfurters or like articles are rotated by underlying rolls, and in which very simple and convenient heating means is provided whereby the frankfurters are broiled while being turned on their axes.

Another object is to provide an appliance in which the frankfurters being cooked are browned superficially in a satisfactory manner, and in which the drying out of the articles and loss of juice are inhibited.

In the accompanying drawings:

Fig. 5 is a section on line 5—5 of Fig. 2; and

Fig. 6 is a side view showing the cover in raised position.

Figure 1:
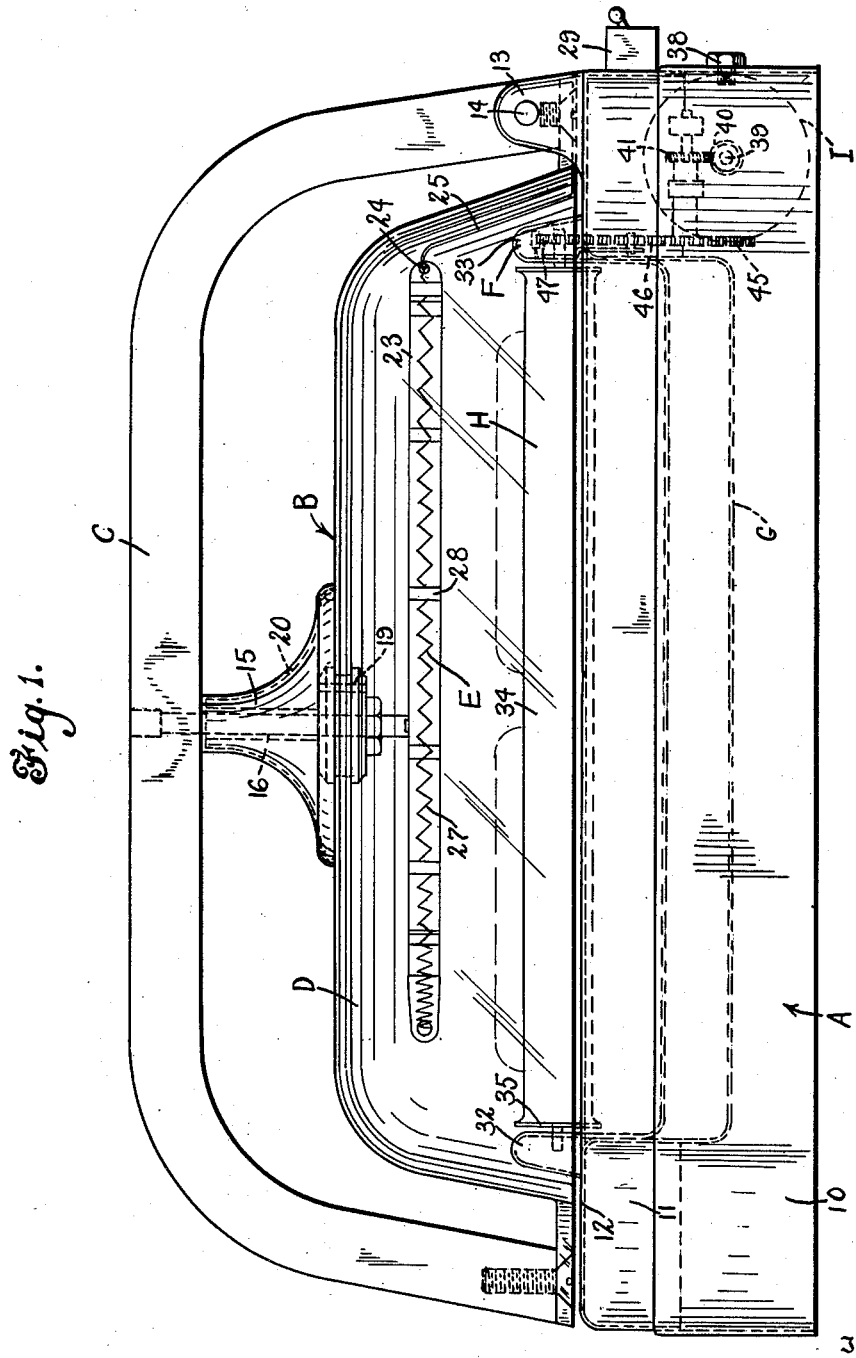
Fig. 1 is a side elevation of a cooking apparatus embodying my improvements, the casing being in the closed position.

The cooker shown in the drawings is one in which a generally rectangular and fairly shallow casing is employed, the same being adapted for table use, the casing having a cover hinged at one end and adapted to be lifted for inserting and removing the food articles. The cover is partially of glass so that the articles being cooked can be readily kept under observation without lifting the cover. Under the cover is a base portion, which in this instance is constructed of metal, the base portion being equipped with a series of parallel supporting rolls upon which the articles are supported and by means of which they are rotated while they are being cooked. The rolls extend longitudinally of the casing and are arranged in a single horizontal plane in this instance, and are adapted to be rotated by a suitable electric motor in the lower or fixed part of the casing. These rolls, moreover, are mounted in a pan-like element which is insertable into and removable from the fixed member of the casing. The upper member or cover is provided with a heating element of the resistance type placed in such manner that in the cooking process radiant heat is directed on the articles as they are being turned on their axes. Provision is also made for creating over the articles a rising curtain of vapor which is vented at the upper part of the cover, the radiant heat acting through this curtain, which action has the advantages hereinafter mentioned. The curtain of vapor is produced in this case from a liquid-containing pan mounted in a fixed part of the casing in a location such that this pan, termed the water pan, receives the element carrying the rolls when said element is placed in the casing.

In the drawings, the lower or fixed part of the casing is indicated at A, the upper or hinged part at B, the handle by which member B may be lifted, at C, the glass bell portion of the cover at D, the heating element generally at E, the roll-containing element or pan at F, the water pan at G, the series of supporting rolls at H, and the roll-rotating motor at I.

The lower part A of the casing is preferably made of sheet metal and has an upstanding wall portion 10 at the lower part, and at the upper part another wall portion 11 suitably connected as by welding to the first wall portion, the wall portion 11 being integral with a metal rim portion 12 extending inwardly, and this rim portion in turn being integral with the water pan G, as appears from Fig. 5. Upstanding from the rim portion 12 at one end of the device is a bracket 13 in which is mounted a pivot pin 14, said pin being carried at one end of the bow-like handle member C and providing for the pivoting of the cover to the lower part of the casing inasmuch as the glass bell D is supported from the handle member in the manner now to be described. Adjacent the bracket 13 the glass bell has an integral lateral extension connected in a suitable manner, as by screwing, to one extremity of the handle C. The handle C may be made of a suitable molded plastic, for example, that is resistant to heat. At the other end the handle is secured in a similar manner to a lateral integral extension of the glass bell. At its middle portion the handle is connected in supporting relation to the glass bell, at the middle portion of the latter, by means such as shown in Fig. 5, involving a bell-shaped metal spacing member 15, a connecting bolt 16 having a nut 17, and a washer 18 interposed between the nut and the lower surface of the glass bell. For the purpose of venting the cooking chamber at the upper part thereof, the cover is provided with a suitable vent, and in this instance a vent hole 19 extends through the parts 18, D, and the base of member 15, and communicates with a vent hole 20 in the side wall of the member 15.

Figure 2:
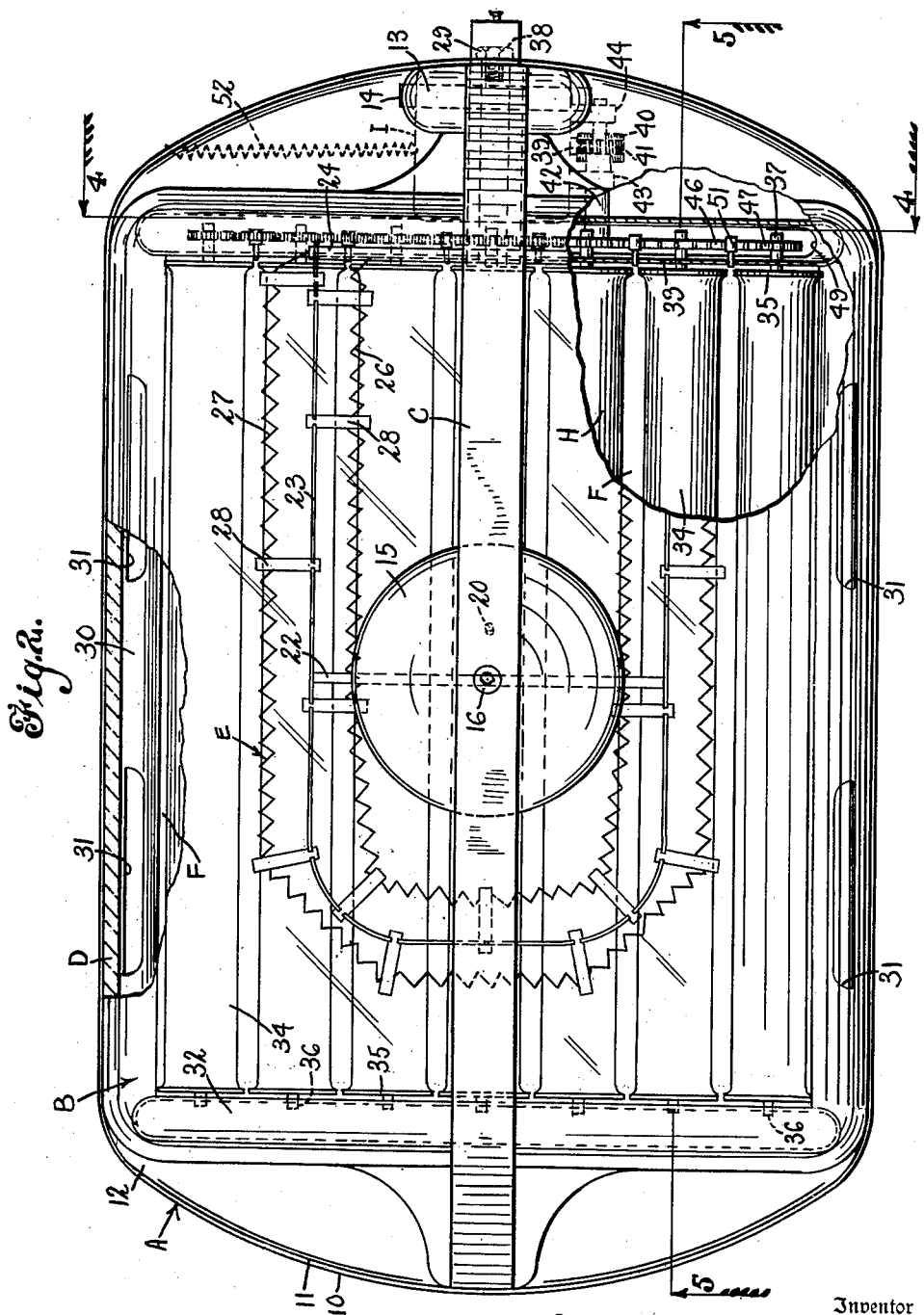
Fig. 2 is a top plan view of the apparatus shown in Fig. 1, certain parts being broken away.

The bolt member or rod member 16 is also used to support the heating element E, for which purpose the bolt has a downward extension 21 suitably attached to a cross member 22 of suitable insulating material that is rigidly supported by the bolt in downwardly spaced relation to the flat top wall of the glass bell. The cross member 22 is attached to a generally U-shaped flat sheet metal supporting member 23 arranged in a horizontal plane and having the closed end of the U at the left-hand end of the cooking chamber, as shown in Fig. 2. The open end of the U-shaped member 23 is disposed toward the hinged end of the cover, and the respective extremities of this member are connected to tubes 24 supported rigidly in the glass bell by means such as sheet metal bracket parts 25, suitably attached at their lower ends to the rim portion of the glass bell. The resistance wires 26 and 27 of the heater element are supported in insulated relationship to the metal supporting strip 23 through the use of a number of spacing and carrying members 28 made of suitable insulating material. The particular supply connections to the wires 26 and 27 are not shown in detail, nor are the incoming connections to the motor I, as it will be apparent that these elements can be connected to a source of current in any desired manner. A switch 29, mounted on the base portion of the casing, at the right-hand end (Fig. 1), is suitable for controlling the heating current, and this may be one for controlling the heating element and the electric motor together or it may cut them in and out in stepwise fashion if that is desired.

Figure 4:
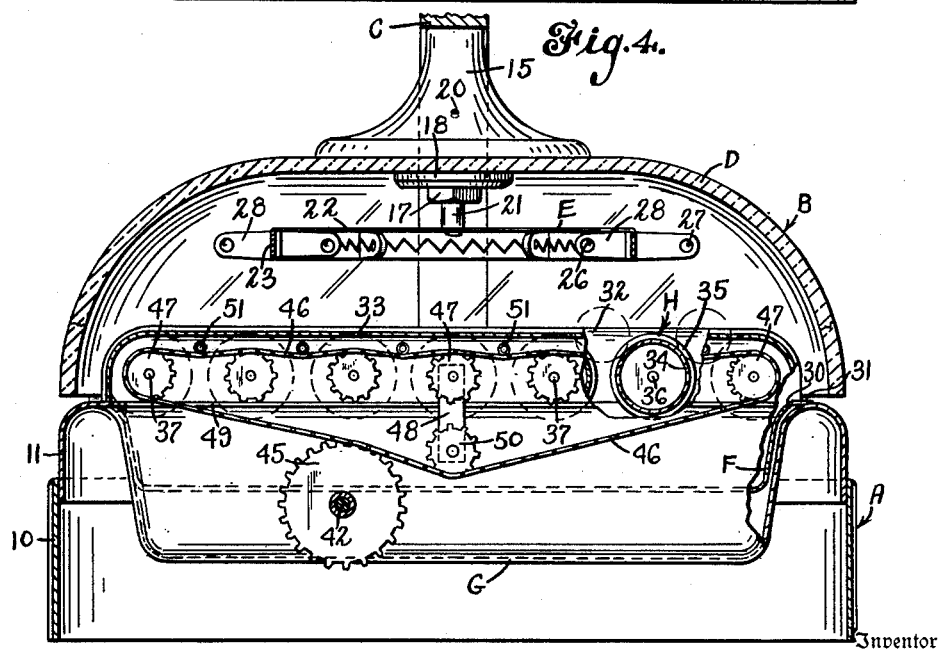
Fig. 4 is a section on line 4—4 of Fig. 2.

Referring now to the base portion A, it will be noted that the pan G, which in this case is integral with the rim portion, is of rectangular shape and of a length and width somewhat less than those of the glass bell, the metal rim part 11 being rounded at the sides of this pan at the upper portion of said part and continued downwardly into the pan structure, which has downwardly and inwardly sloping sides, as shown in Fig. 4. The removable pan F in this form also has downwardly and inwardly sloping sides, as shown in Fig. 4, and the sides of pan F are flanged at their upper ends and rest on the curved-over rim of pan G, as shown in Fig. 4, in a manner to provide a space between the side walls of the respective pans. The upper ends of the side walls of pan F have lips 30 resting on the pan G, and these lips 30 are provided with slots 31 which enable vapor to rise from the lowermost pan and to pass into the glass bell at the side portions thereof. Air can pass into the glass bell at the side and end margins thereof, as will be evident from Figs. 4 and 5, for example, because in these regions air spaces are left between the lower edge of the bell and the upper surface of the base rim.

The pan F is provided at the ends with hollow turned-over portions 32 and 33 that extend upwardly beyond the sides of the pan and are bent or curled over so as to rest on the base rim in the manner shown in Fig. 5, and it is between these portions 32 and 33 that the rolls H are placed. Each roll H may have a tubular metal body 34 with closed-in ends or heads 35, and the roll may be journaled in the end walls of the pan by means such as pins 36, 37 fixed to the respective ends of the roll and entering round holes in the pan walls. In the case shown, the pins 36, 37 have heads disposed and fixed within the head portions of the roll, and the shanks of these pins extend into the hollow pan wall portions 32 and 33. In the case shown there are seven of the rolls H, but the number may be varied as conditions require. These rolls are spaced laterally from each other in such a manner that frankfurters or like articles can be supported between adjacent rolls, as shown by the dotted lines at the right of Fig. 4.

Figure 3:
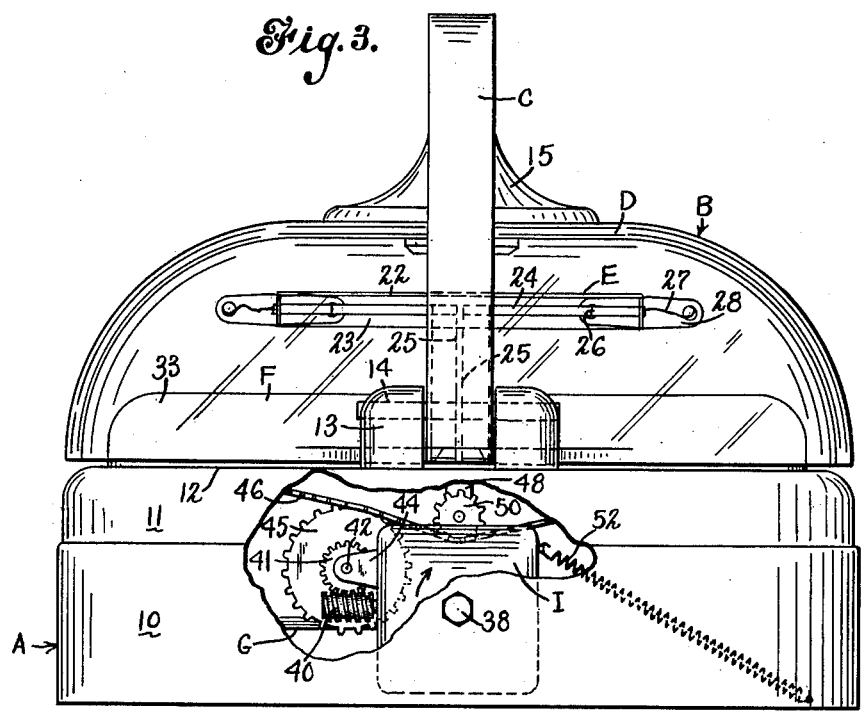
Fig. 3 is an end view.

The rolls H are driven from the motor I by the mechanism which will now be described. The motor I is in the median vertical plane of the appliance, as shown in Fig. 3, and has a pivot mounting 38 in the adjacent end wall of the base, whereby the motor can tilt in a vertical transverse plane, in which plane the shaft 39 of the motor is disposed. The shaft 39 extends toward one side of the appliance casing and carries a worm 40 engaging a worm gear 41 mounted on a shaft 42 that has bearings in brackets 43, 44 supported on the motor casing. The shaft 42 extends longitudinally of the appliance casing and has fixed to its inner end a gear 45. This gear or toothed wheel 45 engages the lower run of an endless chain 46 that rotates all of the rolls H through the intermediary of chain-engaging gears or toothed wheels 47 that are rigid with the journaling pins 37. Extending downwardly from the pan portion 33 at the center of the series of gears is a bracket 48 that is disposed in a slot 49 provided in the adjacent rim portion of the base, said bracket 48 carrying a gear or toothed wheel 50 that engages the lower run of chain 46 at the center of the chain in a manner to hold the chain fairly taut. The engaging point of the gear 45 with the chain is to one side of the gear 50. Preferably also the effective engagement of the chain with the several roll gears 47 is increased through the placement of a number of small rollers 51 on the wall of part 33 in such a manner that these rollers engage the chain in the intervals between the rolls H. The pivotally mounted motor I has attached thereto, at the right side (Fig. 3), a helical spring 52 one end of which is fixed to the appliance base. The effect of this spring is to hold the motor in such position that the gear 45 is in firm engagement with the lower run of the chain. It will be apparent that when the motor is rotated the gear 45 will progress the chain in a manner to rotate all of the rolls H in the same direction whereby the frankfurters will be turned on their axes as long as the chain is actuated in this manner. It will also be apparent that the described construction provides for ready insertion of the pan into position and ready removal of it from the casing when desired. When the pan is removed the rolls H are removed with it, together with the driving chain and associated parts except for the drive gear 45 of the motor, which remains in position in the base. When the pan is reinserted into the base the bracket 48, gear 50, and part of the chain move down through the slot 49, and in doing this the chain is brought into a predetermined position in which it is in cooperative relationship to the driving gear 45.

By the construction described radiant heat is directed against the rotating food articles, a large part of the heat being directed downwardly from the heating element and from the glass bell, and a certain amount of heat being reflected upwardly from the pan F so as to have access to the under parts of the article being cooked. For the purpose of providing an upwardly rising curtain of vapor over the articles being cooked, the pan G is filled with water preferably up to the level indicated by the dotted line in Fig. 5. A certain amount of air enters the casing at the lower margins of the glass bell and passes to the upper vent, and vapor created by the heat rises from the pan G at the sides thereof and moves up into the side margins of the bell through the openings or slots 31. It passes thence inwardly and upwardly to the vent in a rising and narrowing curtain. The heat produced by the heating unit and reflected from the casing is directed against the food articles through this vapor curtain, and through the described action the surfaces of the frankfurters or like articles are uniformly browned as the cooking proceeds, and the juices in the articles retained and conserved.

By the use of apparatus such as described, the required heating and cooking of articles of the nature of frankfurters can be effected in an economical manner, the heating means being of very simple form and arrangement, and by the described form and arrangement of the appliance casing and other parts the articles as cooked are more attractive in appearance and more palatable than heretofore.

It will be apparent that the food articles can be introduced into the appliance and removed therefrom in an especially easy and convenient manner. When the articles are placed upon the support in the base, the cover has a position such as shown in Fig. 6. When it is desired to cook pancakes or like articles, this may be done by placing a metal plate in position over the pan F, as indicated by the dotted lines in Fig. 6.

The external electrical connections to the heating element and to the electric motor may be of any appropriate kind, also the switch arrangement for the heating element and motor.

While only one form of the invention is herein illustrated, the invention can be embodied in many different forms, and various changes may be made without departing from the principles of the invention or the scope of the claims.

What I claim is:

1. Apparatus for cooking articles of food such as frankfurters, comprising a cooking chamber having a hollow base and a liftable bell-shaped cover of glass, the cover having upper venting means and being adapted to admit air between itself and the base, a pan in the base insertable into the base and removable therefrom and carrying a series of imperforate rolls to support and rotate a plurality of frankfurters, means associated with the base for rotating said rolls, a heating element located in the upper part of the cover so as to create radiant heat applied to the frankfurters from above, and a pan in the base below the first pan arranged to hold liquid for generation of an upwardly rising curtain of vapor in the chamber.

2. Apparatus for cooking articles of food such as frankfurters, comprising a cooking chamber having a hollow base and a liftable bell-shaped cover of glass, the cover having upper venting means and being adapted to admit air between itself and the base, a pan in the base insertable into the base and removable therefrom and carrying a series of imperforate rolls to support and rotate a plurality of frankfurters, means associated with the base for rotating said rolls, a heating element located in the upper part of the cover so as to create radiant heat applied to the frankfurters from above, and a pan in the base below the first pan arranged to hold liquid for generation of an upwardly rising curtain of vapor in the chamber, the first pan being received in the second pan.

3. Apparatus for cooking articles of food such as frankfurters, comprising a hollow base, a bell-shaped cover liftable from the base, a heating element located in the upper part of the cover so as to create downwardly directed radiant heat, a plurality of imperforate frankfurter-supporting rolls in the base, and power means in the base for rotating the rolls, said rolls being mounted in a carrying pan insertable into and removable from the base and said rolls being drivable by said power means upon insertion of said pan into the base, said power means including a motor permanently mounted in the base and driving gearing for the rolls at least part of which is removable with the pan, the driving means for the rolls including a driving gear in fixed relation to the motor and a driving chain carried by the pan which, when the pan is introduced into the base, is engaged with said driving gear.

4. Apparatus for cooking elongated articles of food such as frankfurters, comprising a generally rectangular cooking chamber base and a dome-shaped cover hinged to the base at one end, a heating element located in the upper part of the cover so as to create downwardly directed radiant heat, a pan in the base adapted to contain a supply of liquid, another pan mounted within the first somewhat spaced from the first so as to permit a curtain of vapor to rise at the sides of the chamber, said second pan being insertable into and removable from the first pan and carrying a series of longitudinally disposed substantially horizontal article-rotating rolls, said rolls being imperforate, and power means in the base for driving said rolls when the second pan is placed in position in the first.

5. Apparatus for cooking elongated articles of food such as frankfurters, comprising a generally rectangular cooking chamber base and a dome-shaped cover hinged to the base at one end, a heating element located in the upper part of the cover so as to create downwardly directed radiant heat, a pan in the base adapted to contain a supply of liquid, another pan mounted within the first somewhat spaced from the first so as to permit a curtain of vapor to rise at the sides of the chamber, said second pan being insertable into and removable from the first pan and carrying a series of longitudinally disposed substantially horizontal article-rotating rolls, said rolls being imperforate, and power means in the base for driving said rolls when the second pan is placed in position in the first, the driving means for the rolls comprising a series of toothed wheels fixed on the rolls an endless chain engaging said wheels, a toothed wheel mounted in the base adapted to be engaged by said chain, an electric motor driving said last toothed wheel, and yielding means for holding said toothed wheel in driving engagement with the chain.

LYONEL T. FINIZIE.

References Cited in the file of this patent

UNITED STATES PATENTS

| Number | Name | Date |
|---|---|---|
| 453,418 | Stroud | June 2, 1891 |
| 526,712 | Johnston | Oct. 2, 1894 |
| 1,473,213 | De Matteis | Nov. 6, 1923 |
| 1,614,661 | Detwiler | Jan. 18, 1927 |
| 1,673,164 | Silen | June 12, 1928 |
| 2,020,446 | Weisel | Nov. 12, 1935 |
| 2,168,604 | Lee | Aug. 8, 1939 |
| 2,185,979 | Dumas | Jan. 2, 1940 |
| 2,253,434 | Kernick | Aug. 19, 1941 |
| 2,342,692 | Rehm | Feb. 29, 1944 |
| 2,348,545 | Kahn | May 9, 1944 |
| 2,377,873 | Finizie | June 12, 1945 |

FOREIGN PATENTS

| Number | Country | Date |
|---|---|---|
| 203,394 | Switzerland | Mar. 15, 1939 |